United States Patent
Aurand et al.

(10) Patent No.: US 10,414,099 B2
(45) Date of Patent: Sep. 17, 2019

(54) TOOL PATTERN FOR SEALING FLEXIBLE MATERIALS IN TWO SEPARATE PLANES

(71) Applicant: Sonics & Materials, Inc., Newtown, CT (US)

(72) Inventors: William G. Aurand, Cumming, GA (US); Sigfredo Vargas, Sr., Waterbury, CT (US)

(73) Assignee: Sonics & Materials, Inc., Newtown, CT (US)

( * ) Notice: Subject to any disclaimer, the term of this patent is extended or adjusted under 35 U.S.C. 154(b) by 0 days.

(21) Appl. No.: 16/055,465

(22) Filed: Aug. 6, 2018

(65) Prior Publication Data
US 2018/0339461 A1 Nov. 29, 2018

Related U.S. Application Data

(63) Continuation-in-part of application No. 15/784,614, filed on Oct. 16, 2017.
(Continued)

(51) Int. Cl.
*B32B 37/00* (2006.01)
*B29C 65/08* (2006.01)
(Continued)

(52) U.S. Cl.
CPC .......... *B29C 65/08* (2013.01); *B29C 66/1122* (2013.01); *B29C 66/43121* (2013.01);
(Continued)

(58) Field of Classification Search
CPC ... B29C 65/08; B29C 66/8322; B29C 66/834; B65B 51/225
(Continued)

(56) References Cited

U.S. PATENT DOCUMENTS

| 4,001,075 A | 1/1977 | Menzner et al. |
| 4,534,818 A | 8/1985 | Kreager et al. |

(Continued)

FOREIGN PATENT DOCUMENTS

| JP | S6487330 A | 3/1989 |
| JP | H041028 A | 1/1992 |

OTHER PUBLICATIONS

Patel, Ravi K. "Effect of Horn (Sonotorde) Profile of Weld Strength of HDPE Plastic Weld by using Ultrasonic Welding". Ganpat University, Apr. 2014, 91pages http://gnu.inflibnet.ac.in/handle/123456789/2100.

*Primary Examiner* — James D Sells
(74) *Attorney, Agent, or Firm* — Forge IP, PLLC (57) ABSTRACT

An ultrasonic sealing device, including a horn having a sealing surface, an anvil having a sealing surface, at least one of the horn and the anvil being moveable to engage the respective sealing surfaces, the sealing surfaces of the horn and the anvil including a plurality of protrusions and a recess between each of the protrusions, each of the protrusions having a distal surface and sloped sidewalls with curved edges therebetween and each of the recesses including a recess surface with curved edges, wherein, upon engagement of the sealing surface of the horn with the sealing surface of the anvil, the distal surfaces of each of the protrusions on each of the sealing surfaces engage corresponding ones of the recess surfaces of each of the recesses on each of the sealing surfaces and define gaps between the sidewalls of each adjacent protrusion.

26 Claims, 7 Drawing Sheets

Related U.S. Application Data (60) Provisional application No. 62/409,100, filed on Oct. 17, 2016.

(51) Int. Cl.
*B29C 65/00* (2006.01)
*B29L 31/00* (2006.01)

(52) U.S. Cl.
CPC .. *B29C 66/73921* (2013.01); *B29C 66/81435* (2013.01); *B29C 66/834* (2013.01); *B29C 66/8322* (2013.01); *B29C 66/849* (2013.01); *B29C 66/9513* (2013.01); *B29L 2031/7128* (2013.01)

(58) Field of Classification Search
USPC .......................................... 156/580.1, 580.2
See application file for complete search history.

(56) References Cited

U.S. PATENT DOCUMENTS

| | | |
|---|---|---|
| 5,076,040 A | 12/1991 | Davis |
| 6,379,483 B1 * | 4/2002 | Eriksson ................ B29C 65/08 156/251 |
| 6,517,671 B2 | 2/2003 | Couillard et al. |
| 6,562,166 B2 | 5/2003 | Molander et al. |
| 6,835,257 B2 | 12/2004 | Perrine |
| 8,572,936 B2 | 11/2013 | Mancin et al. |
| 8,973,807 B2 | 3/2015 | Fujita et al. |
| 9,278,481 B2 | 3/2016 | Hull |
| 2002/0135272 A1 | 9/2002 | Toda |
| 2006/0202380 A1 | 9/2006 | Bentley et al. |
| 2011/0030315 A1 | 2/2011 | Mancin et al. |
| 2012/0158168 A1 | 6/2012 | Khakhalev |
| 2015/0288123 A1 | 10/2015 | Wagner et al. |

\* cited by examiner

TOOL PATTERN FOR SEALING FLEXIBLE MATERIALS IN TWO SEPARATE PLANES

FIELD OF THE INVENTION

The invention relates to ultrasonic welding or sealing, and more specifically to an ultrasonic sealing device with a tool pattern for sealing flexible materials.

BACKGROUND OF THE INVENTION

Ultrasonic sealing or welding is a process that generates frictional heat to bond thermoplastic materials together. In rigid plastic bonding, a sacrificial feature is typically molded in to one of the mating parts to focus the clamp force and concentrate the development of frictional heat, facilitating the process. This feature is called an energy director.

When using the ultrasonic sealing process to bond thin films, such as pouches, it is not possible to create features in the film as it is manufactured differently than injection molded parts. For this reason, the feature or features required to focus the friction must be incorporated into the tools. The simplest form of ultrasonic tooling for film sealing is a single raised bead in the anvil and a flat horn (sonotrode).

This concept has been used for decades and is effective in generating a leak free seal in films. This simple concept, however, does have some drawbacks. The resulting bond is extremely narrow which concerns some end consumers and limits the strength of the bond. The highly-focused bonding area causes almost all of the film's sealant layer to be forced out of the bond area. This results in a bond only on the edge of the seal bead. And because of the extremely small surface area of this design, the process operating window is very narrow, and is highly sensitive to either too much or too little weld force and duration. The excessive compression that results from such a focused bonding area sometimes damages film structures.

There have been modifications made in order to try to improve upon the simple bead design for added seal strength. One example is illustrated in U.S. Pat. No. 9,278,481 to Hull. This designed disclosed in Hull uses an interlocking horn and anvil with a specific pattern. It consists of a typical 90-degree peak, 4-sided pyramid that has been truncated, producing V-shaped grooves that run at 45 degree angles to the width of the package. The truncated knurl results in a slight engagement when the tools are interlocked. This offers sealing of greater surface areas and the processing window is widened.

However, this design has several drawbacks. In particular, the tools are intended to interlock with just a few thousandths of engagement which results in alignment that is critical and difficult to maintain. The pattern also consists of many sharp corners which stress films and result in tensile and burst failures at the leading edge of the seal. It also incorporates pyramid shaped pockets to accommodate the sealant layer that is forced from the bond area. Because these pockets have a sharp angle at the peaks, the film often bursts at these points from the pressure of the sealant flow overstretching the film in the peaks and valleys. This phenomenon, referred to as film fracturing, can result from the use of such designs.

U.S. Pat. No. 5,076,040 to Davis discloses seal bars for a pouch packing machine having asymmetric sealing surfaces. There are two opposing sealing surfaces with wave patterns defining ridges and grooves. Apices of the ridges contact nadirs of the grooves and at points between each ridge apex and groove nadir a space is formed. However, because Davis is specifically concerned with heat seal bars for heat sealing, the configuration and dimensions of the various components (e.g., ridges, grooves, spacing therebetween, etc.) are specifically adapted therefor. However, it has been found that the configuration of Davis may not produce acceptable results in the context of ultrasonic sealing, since areas of localized stress and strain are produced, thereby making the seals produced by the Davis configuration prone to failure and leakage if used in connection with ultrasonic sealing systems rather than heat sealing systems.

Therefore, there is a need for improved sealing tools and processes that are particularly suited to ultrasonic sealing.

SUMMARY OF THE INVENTION

Accordingly, it is an object of the present invention to provide an ultrasonic tool with an improved seal pattern presented on each of the horn and the anvil.

In accordance with a first aspect of the present invention, an ultrasonic sealing device includes a horn having a sealing surface and an anvil having a sealing surface, at least one of the horn and the anvil being moveable to engage the sealing surface of the horn with the sealing surface of the anvil. The sealing surfaces of each of the horn and the anvil include a plurality of protrusions and a recess between each pair of the protrusions, each of the protrusions having distal surface and sidewalls with curved edges therebetween and each of the recesses including a recess surface with curved edges. Upon engagement of the sealing surface of the horn with the sealing surface of the anvil, the distal surfaces of each of the protrusions on each of the sealing surfaces engage corresponding ones of the recess surfaces of each of the recesses on each of the sealing surfaces and define gaps between the sidewalls of each adjacent protrusion. Each of the protrusions on the horn, each of the protrusions on the anvil, each of the recesses in the horn and each of the recesses in the anvil has a radius of curvature between 0.031 inches and 0.055 inches.

In some embodiments, each of the protrusions on the horn has a radius of curvature between 0.045 inches and 0.055 inches, each of the protrusions on the anvil has a radius of curvature between 0.031 inches and 0.041 inches, each of the recesses in the horn has a radius of curvature between 0.045 inches and 0.055 inches and each of the recesses in the anvil has a radius of curvature between 0.042 inches and 0.052 inches. In certain embodiments, each of the protrusions on the horn has a radius of curvature of about 0.050 inches, each of the protrusions on the anvil has a radius of curvature of about 0.036 inches, each of the recesses in the horn has a radius of curvature of about 0.050 inches and each of the recesses in the anvil has a radius of curvature of about 0.047 inches.

In some embodiments, the gaps between the sidewalls of each adjacent protrusion have a width between 0.001 inches to 0.003 inches. In certain embodiments, the gaps between the sidewalls of each adjacent protrusion have a width of about 0.002 inches.

In some embodiments, a height of each of the protrusions on the horn and each of the protrusions on the anvil is between 0.005 inches and 0.015 inches. In certain of these embodiments, the height of each of the protrusions on the horn and each of the protrusions on the anvil is about 0.010 inches.

In some embodiments, upon engagement of the sealing surface of the horn with the sealing surface of the anvil, the distal surfaces of each of the protrusions on each of the sealing surfaces engage corresponding ones of the recess surfaces of each of the recesses on each of the sealing surfaces and define a plurality of melt initiation points. In certain embodiments, a first subset of the plurality of melt initiation points lie in a first plane and a second subset of the plurality of melt initiation points lie in a second plane parallel to the first plane, such that the plurality of melt initiation points lie in the two parallel planes. In certain of these embodiments, the first plane and the second plane are spaced apart by between 0.005 inches and 0.015 inches. In certain embodiments, the first plane and the second plane are spaced apart by about 0.010 inches.

In accordance with another aspect of the present invention, an ultrasonic sealing device includes a horn having a sealing surface and an anvil having a sealing surface, at least one of the horn and the anvil being moveable to engage the sealing surface of the horn with the sealing surface of the anvil. The sealing surfaces of each of the horn and the anvil include a plurality of protrusions and a recess between each pair of the protrusions, each of the protrusions having distal surface and sidewalls with curved edges therebetween and each of the recesses including a recess surface with curved edges. Upon engagement of the sealing surface of the horn with the sealing surface of the anvil, the distal surfaces of each of the protrusions on each of the sealing surfaces engage corresponding ones of the recess surfaces of each of the recesses on each of the sealing surfaces and define a plurality of melt initiation points with gaps between the sidewalls of each adjacent protrusion. A first subset of the plurality of melt initiation points lie in a first plane and a second subset of the plurality of melt initiation points lie in a second plane parallel to the first plane, such that the plurality of melt initiation points lie in the two parallel planes.

Other objects of the invention and its particular features and advantages will become more apparent from consideration of the following drawings and accompanying detailed description.

DETAILED DESCRIPTION OF THE INVENTION

Figure 1:
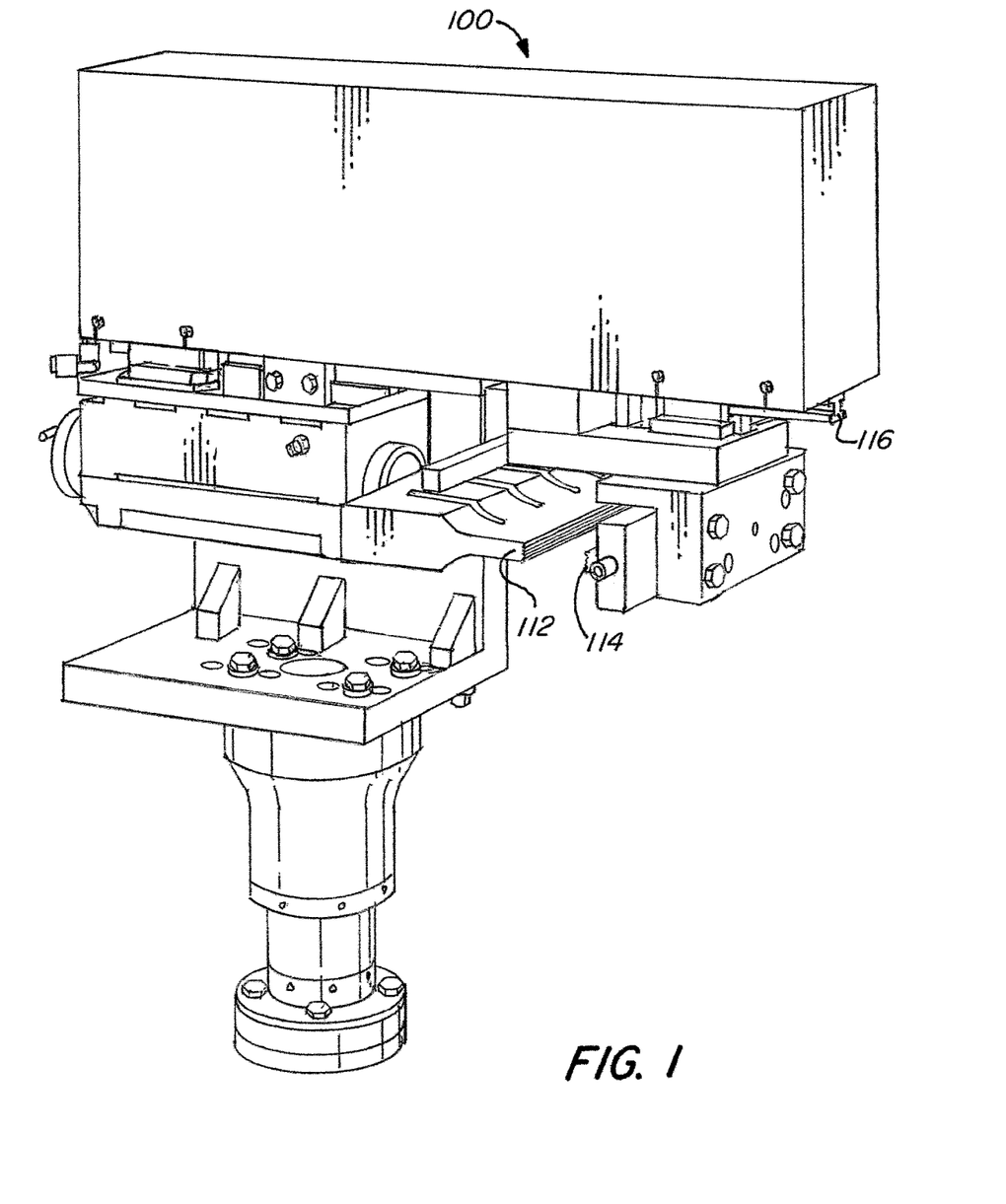
FIG. 1 illustrates an ultrasonic sealing device according to an embodiment of the present invention, the device including a tool.

FIG. 1 illustrates an ultrasonic sealing device 100 including a tool 110 with a horn 112 and an anvil 114 according to an exemplary embodiment of the present invention. One of the portions of the tool 110, e.g., the anvil 114, is moveable along a track 116 towards and away from the other portion of the tool 110, e.g., the horn 112. Embodiments of the present invention may also include or be used in other ultrasonic sealing devices and machines, such as the device shown in FIG. 8 of commonly owned U.S. Publication 2017/0152064, the contents of which are incorporated herein by reference.

Figure 2:
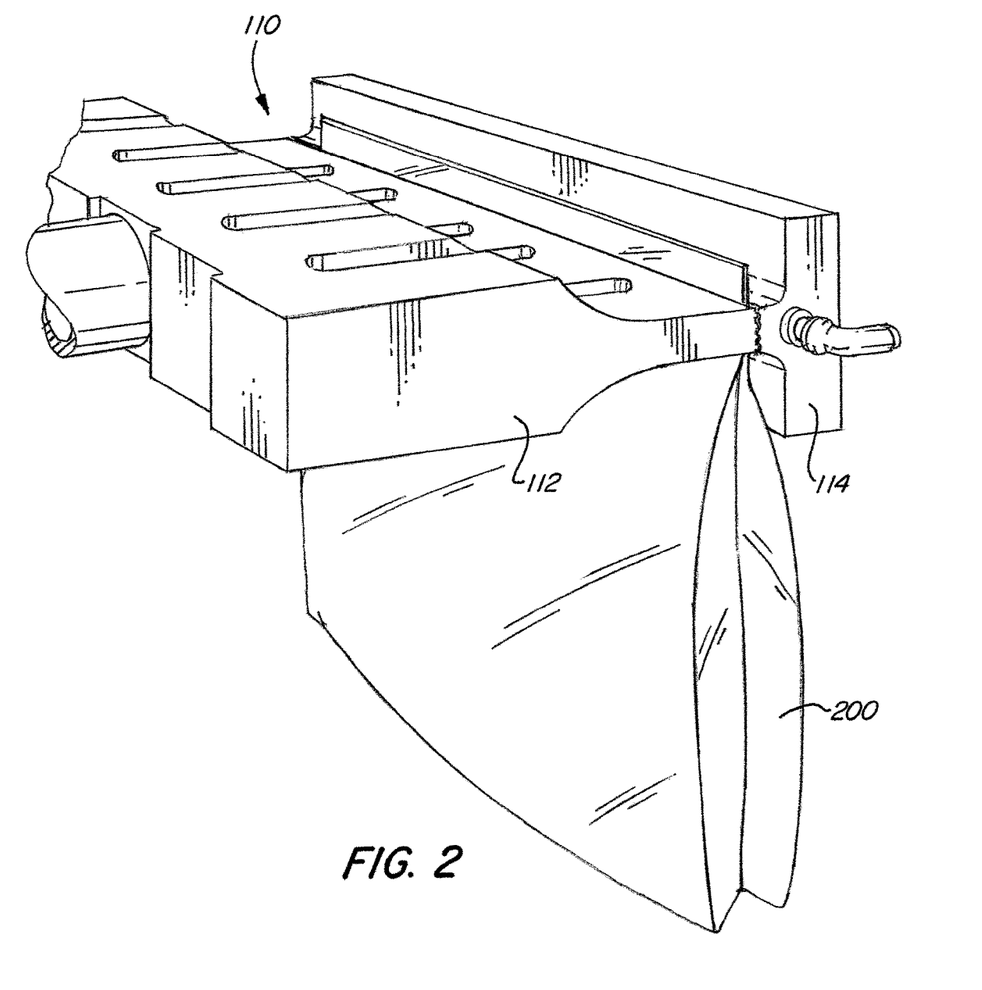
FIG. 2 further illustrates the tool of the device shown in FIG. 1 including a part being sealed.

The tool 110 is further illustrated in FIG. 2. As one skilled in the art will understand, a part 200 to be sealed is pressed between the horn 112 and anvil 114. The part 200 may be, for example, a pouch made of a flexible packaging material containing a product (e.g., food product). For example, the part 200 may be a retort pouch. Ultrasonic vibrations are emitted by the sealing device 100 to the part 200 via the horn 112 to create a seal. The frequency of the vibration may be, for example, 15 kHz or greater, such as 20 kHz, 30 kHz, 35 kHz, 40 kHz or 70 kHz.

Each of the horn 112 and the anvil 114 have a mating or sealing surface which interface with one another to create the seal on the part 200. For example, in the case of a pouch, a seal is created to close an end of the pouch after it is filled. The seal has a seal pattern corresponding to the contours of the sealing surfaces of the horn 112 and the anvil 114.

Figure 3A:
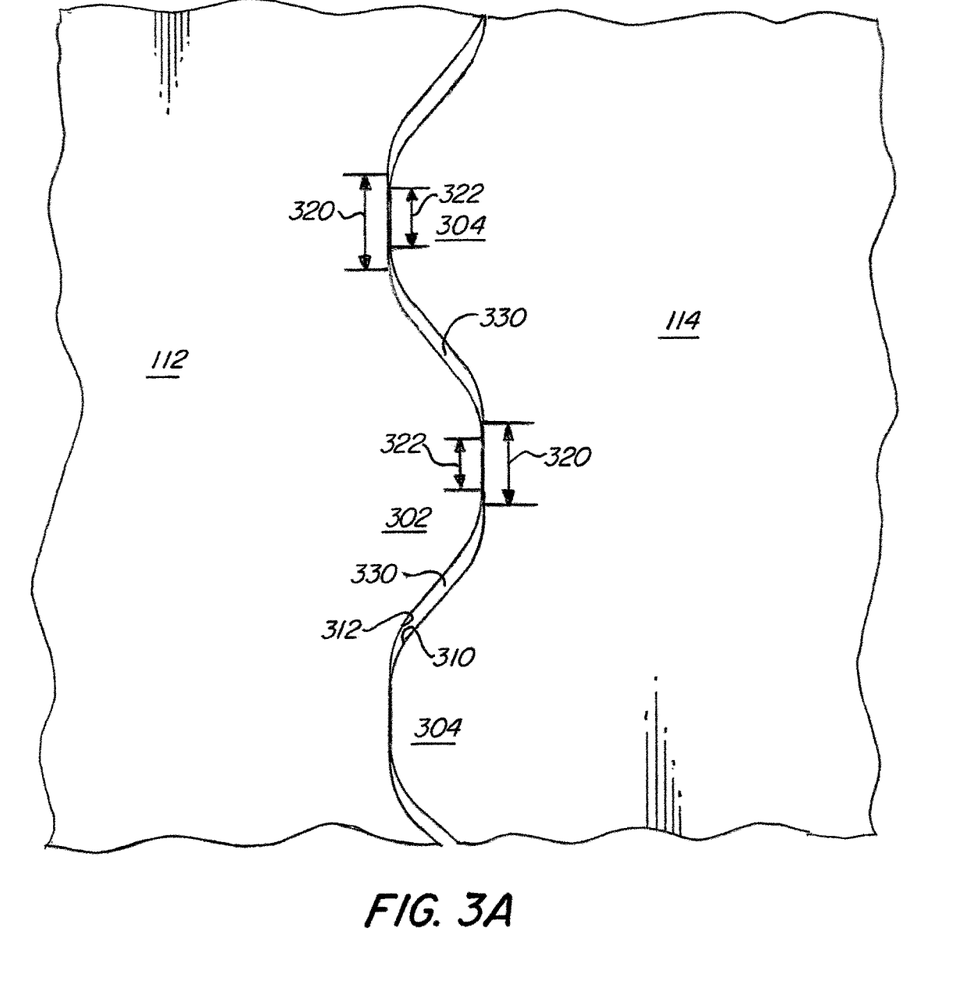
FIGS. 3A-3B are schematic views of an exemplary embodiment of the tool shown in FIG. 2.

FIG. 3A is a schematic view of the ultrasonic tool 110 according to an exemplary embodiment of the present invention. The tool 110 includes the horn 112 and the anvil 114 with adjacent surfaces which create the seal pattern. The seal pattern is innovative in that it incorporates the benefits of existing basic bead technology but alters it in significant ways that provide substantial benefits.

The seal pattern is formed by multiple seal beads 302/304 (e.g., protrusions or ridges) running along sealing surfaces of both the horn 112 and anvil 114, e.g., along their entire lengths or large parts thereof. The pattern includes rolling humps, with no sharp angles, defining peaks and valleys or recesses extending in a wavy pattern. The pattern is generally the same on each of the horn 112 and the anvil 114 however it is of course offset such that the peaks on the horn 112 engage into valleys on the anvil 114, and vice versa. In one embodiment, the horn 112 has five beads 302 and four recesses, and the anvil 114 has four beads 304 and five recesses. In another embodiment, the horn 112 has only one bead 302 with flat portions or recesses on either side, and the anvil 114 has two beads 304 with flat portions or recesses on either side.

Each of the peaks of the beads 302/304 and corresponding recesses has a flat surface or landing area where a seal is formed, i.e., seal initiation points. In particular, each recess has a flat area or surface 320 with a recess width. Each peak has a flat area or surface 322 with a peak width. In the exemplary embodiment, the flats 320 in the recesses are larger in width than the flats 322 on the peaks to which they engage. For example, in one embodiment, the flats 322 on the peaks have a width selected from the range of 0.004 in. to 0.020 in. (e.g., 0.008 in.) while the flats 320 in the recesses have a greater width selected from the range of 0.006 in. to 0.030 in. (e.g., 0.016 in.). In the exemplary embodiment, all the peak surfaces 322 have the same width as one another and all the recess surfaces 320 have the same width as one another. However, in some embodiments, the peak and recess widths could be larger on one portion of the tool 110 (e.g., the top) to create varying seal widths.

The lengths of the flat areas 320/322 generally extend the lengths of the sealing surfaces of the horn 112 or anvil 114. As shown in FIG. 3A, each the peaks of the beads 302/304 has a first radius 310 (on each side of the flat distal surface) and each of the recesses have a second radius 312 (on each side of the flat recess surface) being larger than the first radius 310.

The wavy surfaces of the horn 112 and the anvil 114 are precisely aligned and contact only on the flats 320/322. Due to the differences in the radiuses 310 and 312 and/or the differences in the sizes of the flats 320/322, gaps 330 remain between each of the peaks and the recesses when the horn 112 is engaged with the anvil 114. As discussed in more detail below, material flows into these gaps 330 during the ultrasonic sealing process.

Figure 3B:
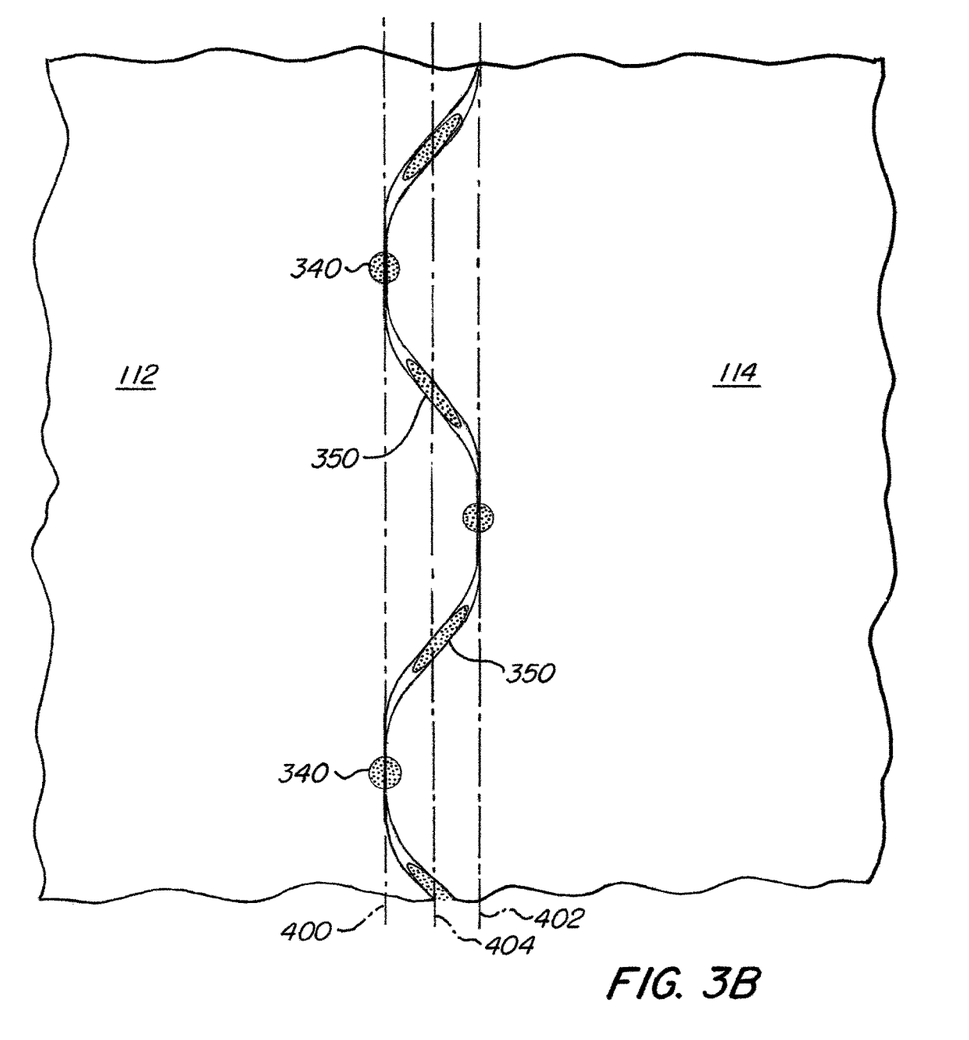

FIG. 3B further illustrates the tool 110 schematically and identifies seal initiation points 340 and sealant flow points 350. The horn 112 and the anvil 114 contact one another only on the flats 320/322 which define the seal initiation points 340. A pattern thus results in seals occurring in at least two different planes 400/402, being parallel to one another and/or the film barrier, producing a wavy appearance of the resulting seal (e.g., a series of linear waves that run parallel to the width of the package). The familiar appearance eliminates any issues of consumer acceptance that are common with other ultrasonic seals.

The two-plane 400/402 design produces a zigzag effect within the seal area that grips the part or film 200 more securely, eliminating sliding issues that occur with traditional ultrasonic bead tool. In the exemplary embodiment, the two planes 400/402 are 0.005 in. or more (e.g., 0.010 in.) apart depending on the film thickness. Further, due to the use of multiple tightly spaced beads or protrusions, the overall effective seal is wider than when a traditional single rounded bead is used.

The specific height and spacing of the seal beads 302/304 in the seal pattern are well thought out. In an exemplary embodiment, the pattern is manufactured by grinding or wire EDM machining the pattern into the tools to provide for superior dimensional consistency. Due to the particular shape, the beads 302/304 are engineered such that the diagonally situated gap 330 is formed between each of the seal initiation points 340 and provides room for some, but not all, of the sealant flow 350. These gaps 330, which are slightly undersized, maintain hydraulic compression on the molten sealant that flows away from the focused seal points 340.

In the exemplary embodiment, the gaps 330 typically have a width ranging from 0.002 in. to 0.010 in. (e.g., 0.003 in.) and a length ranging from 0.002 in. to 0.010 in. (e.g., 0.004 in.) depending upon the film thickness. This zigzag design of the sealant channel restricts the flow of the molten sealant, slowing its evacuation from the bond area. This key concept reduces film stress and increases seal strength by preventing the majority of the sealant from flowing out of the joint.

This hydraulic compression/restricted sealant flow concept is one important part of what differentiates the seal pattern according to the present invention from others. Further, the design of the present invention causes melt to flow from the peaks and valleys into the side channels or gaps 330. Prior art designs that weld on the sides of the peaks generally force melt flow into the peaks and valleys rather than away.

The height of the beads 302/304 is specific and may vary depending upon the film specifications, but is typically between 0.005 in. and 0.025 in. tall, such as 0.005 in., 0.010 in., 0.015 in., 0.020 in., or 0.025 in. The spacing of the beads 302/304 is important in that it provides a location for some of sealant flow but prevents evacuation of the majority of sealant from the seal area. The multi-plane, multi-pocket design and the resulting hydraulic resistance that it produces hinders the flow of the molten sealant. This hydraulic resistance provides two primary benefits. It slows the collapse of the film layers, resulting in a wider operating window. And, it maintains greater quantities of sealant between the film layers which produces substantial increases in bond strength.

In a recent independent lab study, the seal pattern according to the present invention produced bond strength averages 40% stronger than the average best design competitive ultrasonic seals (e.g., Herrmann). Even more impressive, the inventive design produced bond strengths averaging nearly 20% stronger than heat seals that were twice as wide. Never before has ultrasonic sealing delivered such superior strength to heat sealing. The gentle radii 310/312 at the top and base of each bead have also been found to eliminate the stresses that result from sharp corners or the over-compression of modified single bead designs.

Figure 4:
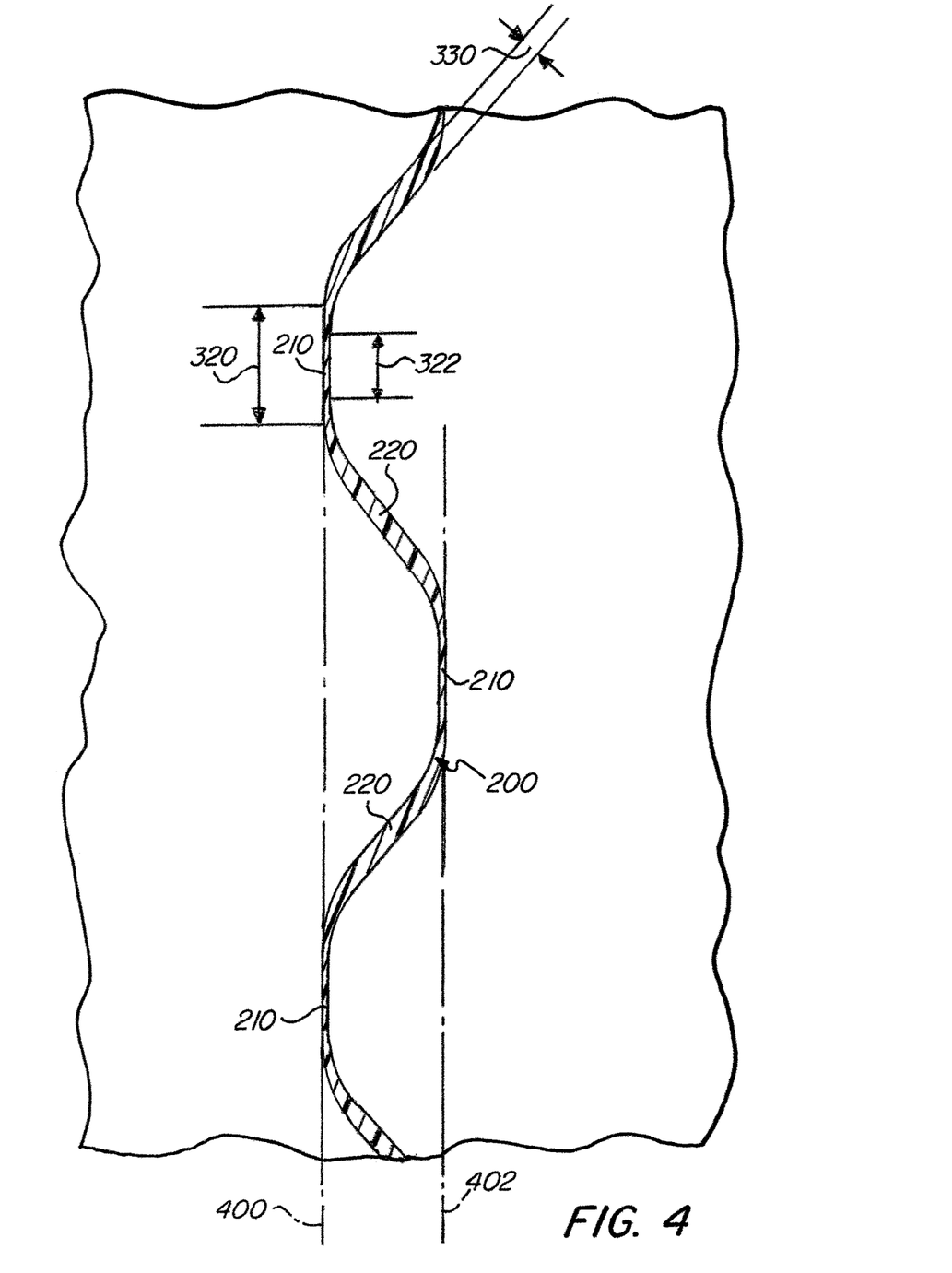
FIG. 4 is a side view of the tool shown in FIGS. 3A-3B including the part being sealed.

FIG. 4 shows the horn 112 and anvil 114 with the part 200, such as a plastic pouch, being sealed therebetween. The seal pattern has been painstakingly designed with specific bead dimensions and spacing that provide the necessary frictional focus points to initiate the melt while also allowing slightly under-sized pockets to contain a portion of the film sealant layer and restrict its flow. As such, the part includes portions 210 that are sealed and portions 220 where sealant or material flow is captured. As illustrated, the sealed portions 210 reside in two different substantially parallel planes 400/402.

Figure 5:
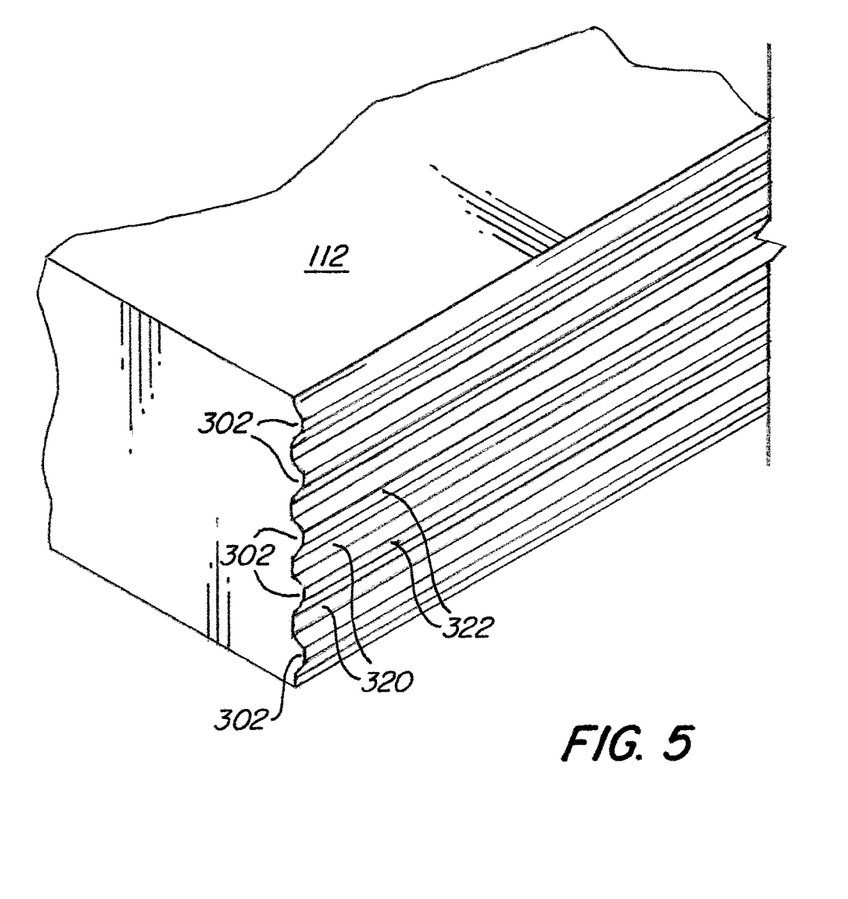
FIG. 5 illustrates a sealing surface of a horn portion of the tool shown in FIGS. 3A-3B.

FIG. 5 is a detail view of sealing surface of the horn 112. As shown, the surface has the plurality of beads or protrusions 302 and recesses therebetween. Each protrusion 302 has a flat distal surface 322 and sloped sidewalls with curved edges therebetween and each of the recesses has a flat recess surface 320 with curved edges leading to the sloped sidewalls. In a preferred embodiment, the curves adjacent to the flat recess surfaces are greater (e.g., larger radius) than the curves adjacent to the flat distal surfaces. The anvil 114 would have a complementary sealing surface with protrusions 302 to engage in recesses of the horn 112 and vice versa.

To achieve larger seal areas, the pattern can be repeated as needed. For example, the horn 112 may have one bead, five beads, seven beads, or more. The end result is an ultrasonic seal with unparalleled bond strength and no damage to the film. Further, the unique design provides ease of processing under a wide range of conditions. The design is a truly unique breakthrough in ultrasonic sealing and provides previously unattained bond strengths.

Figure 6:
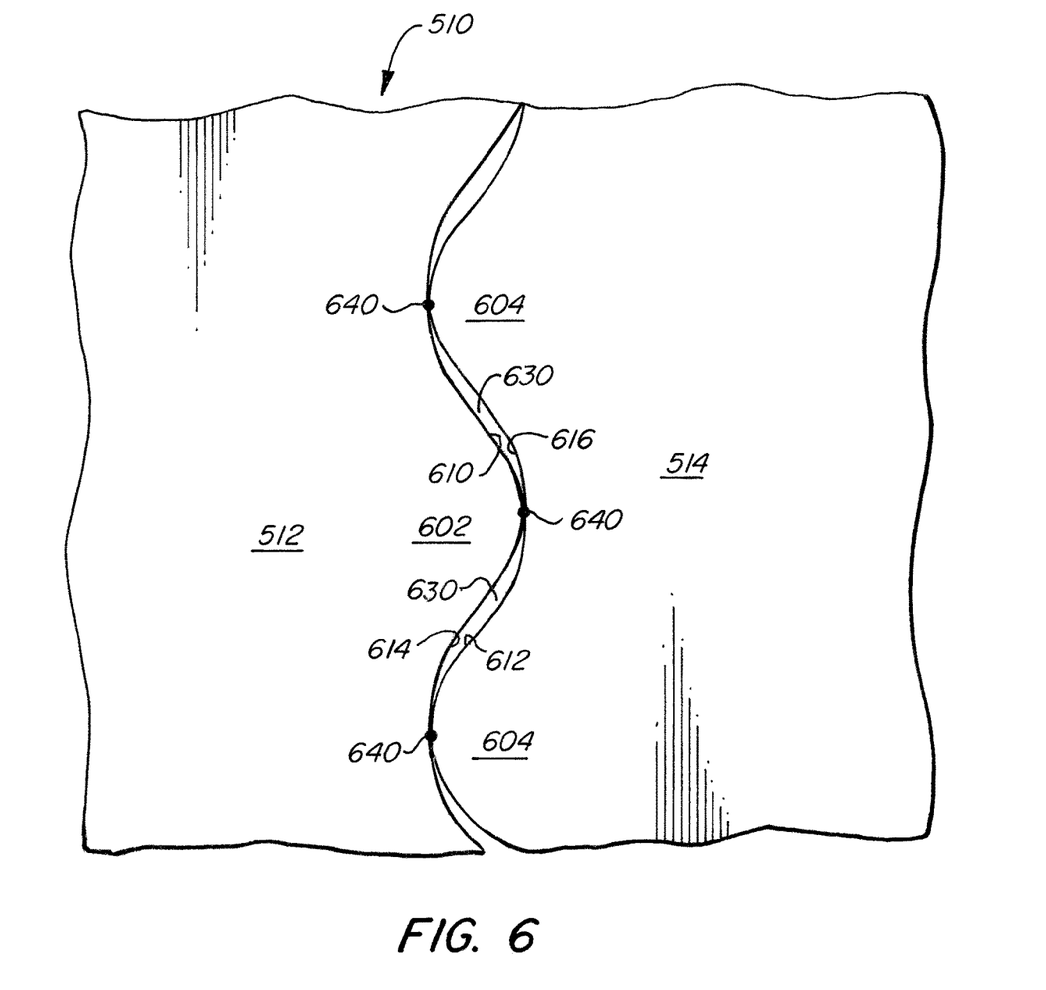
FIG. 6 illustrates an alternative exemplary embodiment of the tool shown in FIG. 2, which may be used with the device shown in FIG. 1.

Referring now to FIG. 6, shown is a schematic view of another exemplary embodiment of an ultrasonic tool 510 according to the present invention. The tool 510 includes the horn 512 and the anvil 514 with adjacent surfaces which create the seal pattern. The seal pattern is innovative in that it incorporates the benefits of existing basic bead technology but alters it in significant ways that provide substantial benefits, particularly in the context of ultrasonic sealing systems.

The seal pattern is formed by multiple seal beads 602/604 (e.g., protrusions or ridges) running along sealing surfaces of both the horn 512 and anvil 514, e.g., along their entire lengths or large parts thereof. The pattern includes rolling humps, with no sharp angles, defining peaks and valleys or recesses extending in a wavy pattern. As is explained in greater detail below, the pattern is preferably slightly different in dimension on each of the horn 512 and the anvil 514, in addition to, of course, being offset such that the peaks on the horn 512 engage into valleys on the anvil 514, and vice versa. In one embodiment, the horn 512 has five beads 602 and four recesses, and the anvil 514 has four beads 604 and five recesses. In another embodiment, the horn 512 has only one bead 602 with recesses on either side, and the anvil 514 has two beads 604 with recesses on either side.

Unlike the embodiment described above with respect to FIGS. 3A-5, each of the peaks of the beads 602/604 and corresponding recesses is defined by a continuously curving surface, without a flat surface or landing area. In the exemplary embodiment, all the beads 602 have the same dimensions as one another and all the beads 604 have the same dimensions as one another. However, in some embodiments, beads 602 and/or the beads 604 could be larger on one portion of the tool 510 (e.g., the top) to create varying seal widths. Moreover, the beads 602 may have the same dimensions as the beads 604, although in a preferred embodiment, the beads 602 are different in dimension than the beads 604.

As shown, each the peaks of the beads 602 of the horn 512 has a radius 610, each of the peaks of the beads 604 of the anvil 514 has a radius 612, each of the recesses of the horn 512 has a radius 614 and each of the recesses of the anvil 514 has a radius 616. In general, it is desired for all of the radiuses 610/612/614/616 to fall within the range of 0.031 inches to 0.055 inches.

More particularly, it has been found that the following dimensions produce excellent results: each the peaks of the beads 602 of the horn 512 has a radius 610 between 0.045 inches and 0.055 inches (most preferably about 0.050 inches); each of the peaks of the beads 604 of the anvil 514 has a radius 612 between 0.031 inches and 0.041 inches (most preferably about 0.036 inches); each of the recesses of the horn 512 has a radius 614 between 0.045 inches and 0.055 inches (most preferably about 0.050 inches) and each of the recesses of the anvil 514 has a radius 616 between 0.042 inches and 0.052 inches (most preferably about 0.047 inches).

The wavy surfaces of the horn 512 and the anvil 514 are precisely aligned and contact only at the interfaces between the peaks of the beads 602/604 and the bottoms of the corresponding recesses on the horn 512 and anvil 514. Due to the differences in the radiuses 610/612/614/616, gaps 630 remain between each of the peaks and the recesses when the horn 512 is engaged with the anvil 514. As discussed in more detail below, material flows into these gaps 630 during the ultrasonic sealing process.

More specifically, the interfaces between the peaks of the beads 602/604 and the bottoms of the corresponding recesses on the horn 512 and anvil 514 act as seal initiation points 640. A pattern thus results in seals occurring in at least two different planes, being parallel to one another and/or the film barrier, producing a wavy appearance of the resulting seal (e.g., a series of linear waves that run parallel to the width of the package). The familiar appearance eliminates any issues of consumer acceptance that are common with other ultrasonic seals.

The two-plane design produces a zigzag effect within the seal area that grips the part or film 200 more securely, eliminating sliding issues that occur with traditional ultrasonic bead tool. In the exemplary embodiment of FIG. 6, the two planes in which the seal initiation points 640 lie are spaced by 0.010 inches, which has been found to provide film stress reduction as well as an aesthetically pleasing finished product. Further, due to the use of multiple tightly spaced beads or protrusions, the overall effective seal is wider than when a traditional single rounded bead is used.

The specific height and spacing of the seal beads 602/604 in the seal pattern are well thought out. In an exemplary embodiment, the pattern is manufactured by grinding or wire EDM machining the pattern into the tools to provide for superior dimensional consistency. Due to the particular shape, the beads 602/604 are engineered such that the diagonally situated gap 630 is formed between each of the seal initiation points 640 and provides room for some, but not all, of the sealant flow. These gaps 630, which are slightly undersized, maintain hydraulic compression on the molten sealant that flows away from the focused seal points 640.

In the exemplary embodiment, the gaps 630 typically have a width ranging from 0.001 inches to 0.003 inches, with about 0.002 inches having been found to provide optimal results. This zigzag design of the sealant channel restricts the flow of the molten sealant, slowing its evacuation from the bond area. This key concept reduces film stress and increases seal strength by preventing the majority of the sealant from flowing out of the joint.

This hydraulic compression/restricted sealant flow concept is one important part of what differentiates the seal pattern according to the present invention from others, particularly those seals designed for use with heat sealing systems. Further, the design of the present invention causes melt to flow from the peaks and valleys into the side channels or gaps 630. Prior art designs that weld on the sides of the peaks generally force melt flow into the peaks and valleys rather than away.

The height of the beads 602/604 is specific and may vary depending upon the film specifications, but is typically between 0.005 inches and 0.015 inches tall, with about 0.010 inches having been found to be optimal in order to provide film stress reduction as well as an aesthetically pleasing finished product. The spacing of the beads 602/604 is also important in that it provides a location for some of sealant flow but prevents evacuation of the majority of sealant from the seal area. The multi-plane, multi-pocket design and the resulting hydraulic resistance that it produces hinders the flow of the molten sealant. This hydraulic resistance provides two primary benefits. It slows the collapse of the film layers, resulting in a wider operating window. And, it maintains greater quantities of sealant between the film layers which produces substantial increases in bond strength.

To achieve larger seal areas, the pattern can be repeated as needed. For example, the horn 512 may have one bead, five beads, seven beads, or more. The end result is an ultrasonic seal with unparalleled bond strength and no damage to the film. Further, the unique design provides ease of processing under a wide range of conditions. The design is a truly unique breakthrough in ultrasonic sealing and provides previously unattained bond strengths.

Although the invention has been described with reference to a particular arrangement of parts, features and the like, these are not intended to exhaust all possible arrangements or features, and indeed many modifications and variations will be ascertainable to those of skill in the art.

What is claimed is:
1. An ultrasonic sealing device, comprising:
a horn having a sealing surface;
an anvil having a sealing surface, at least one of said horn and said anvil being moveable to engage the sealing surface of said horn with the sealing surface of said anvil;
the sealing surfaces of each of said horn and said anvil including a plurality of protrusions and a recess between each pair of the protrusions, each of the protrusions having distal surface and sidewalls with curved edges therebetween and each of the recesses including a recess surface with curved edges;

wherein, upon engagement of the sealing surface of said horn with the sealing surface of said anvil, the distal surfaces of each of the protrusions on each of the sealing surfaces engage corresponding ones of the recess surfaces of each of the recesses on each of the sealing surfaces and define gaps between the sidewalls of each adjacent protrusion; and wherein each of the protrusions on said horn, each of the protrusions on said anvil, each of the recesses in said horn and each of the recesses in said anvil has a radius of curvature between 0.031 inches and 0.055 inches.

2. The ultrasonic sealing device of claim 1 wherein each of the protrusions on said horn has a radius of curvature between 0.045 inches and 0.055 inches, each of the protrusions on said anvil has a radius of curvature between 0.031 inches and 0.041 inches, each of the recesses in said horn has a radius of curvature between 0.045 inches and 0.055 inches and each of the recesses in said anvil has a radius of curvature between 0.042 inches and 0.052 inches.

3. The ultrasonic sealing device of claim 2 wherein each of the protrusions on said horn has a radius of curvature of about 0.050 inches, each of the protrusions on said anvil has a radius of curvature of about 0.036 inches, each of the recesses in said horn has a radius of curvature of about 0.050 inches and each of the recesses in said anvil has a radius of curvature of about 0.047 inches.

4. The ultrasonic sealing device of claim 1 wherein the gaps between the sidewalls of each adjacent protrusion have a width between 0.001 inches to 0.003 inches.

5. The ultrasonic sealing device of claim 4 wherein the gaps between the sidewalls of each adjacent protrusion have a width of about 0.002 inches.

6. The ultrasonic sealing device of claim 1 a height of each of the protrusions on said horn and each of the protrusions on said anvil is between 0.005 inches and 0.015 inches.

7. The ultrasonic sealing device of claim 6 wherein the height of each of the protrusions on said horn and each of the protrusions on said anvil is about 0.010 inches.

8. The ultrasonic sealing device of claim 1 wherein, upon engagement of the sealing surface of said horn with the sealing surface of said anvil, the distal surfaces of each of the protrusions on each of the sealing surfaces engage corresponding ones of the recess surfaces of each of the recesses on each of the sealing surfaces and define a plurality of melt initiation points.

9. The ultrasonic sealing device of claim 8 wherein a first subset of the plurality of melt initiation points lie in a first plane and a second subset of the plurality of melt initiation points lie in a second plane parallel to the first plane, such that the plurality of melt initiation points lie in the two parallel planes.

10. The ultrasonic sealing device of claim 8 wherein the first plane and the second plane are spaced apart by between 0.005 inches and 0.015 inches.

11. The ultrasonic sealing device of claim 10 wherein the first plane and the second plane are spaced apart by about 0.010 inches.

12. An ultrasonic sealing device, comprising:
a horn having a sealing surface;
an anvil having a sealing surface, at least one of said horn and said anvil being moveable to engage the sealing surface of said horn with the sealing surface of said anvil;
the sealing surfaces of each of said horn and said anvil including a plurality of protrusions and a recess between each pair of the protrusions, each of the protrusions having distal surface and sidewalls with curved edges therebetween and each of the recesses including a recess surface with curved edges;

wherein, upon engagement of the sealing surface of said horn with the sealing surface of said anvil, the distal surfaces of each of the protrusions on each of the sealing surfaces engage corresponding ones of the recess surfaces of each of the recesses on each of the sealing surfaces and define a plurality of melt initiation points with gaps between the sidewalls of each adjacent protrusion; and wherein a first subset of the plurality of melt initiation points lie in a first plane and a second subset of the plurality of melt initiation points lie in a second plane parallel to the first plane, such that the plurality of melt initiation points lie in the two parallel planes.

13. The ultrasonic sealing device of claim 12 wherein each of the protrusions on said horn, each of the protrusions on said anvil, each of the recesses in said horn and each of the recesses in said anvil has a radius of curvature between 0.031 inches and 0.055 inches.

14. The ultrasonic sealing device of claim 13 wherein each of the protrusions on said horn has a radius of curvature between 0.045 inches and 0.055 inches, each of the protrusions on said anvil has a radius of curvature between 0.031 inches and 0.041 inches, each of the recesses in said horn has a radius of curvature between 0.045 inches and 0.055 inches and each of the recesses in said anvil has a radius of curvature between 0.042 inches and 0.052 inches.

15. The ultrasonic sealing device of claim 14 wherein each of the protrusions on said horn has a radius of curvature of about 0.050 inches, each of the protrusions on said anvil has a radius of curvature of about 0.036 inches, each of the recesses in said horn has a radius of curvature of about 0.050 inches and each of the recesses in said anvil has a radius of curvature of about 0.047 inches.

16. The ultrasonic sealing device of claim 12 wherein the gaps between the sidewalls of each adjacent protrusion have a width between 0.001 inches to 0.003 inches.

17. The ultrasonic sealing device of claim 16 wherein the gaps between the sidewalls of each adjacent protrusion have a width of about 0.002 inches.

18. The ultrasonic sealing device of claim 12 a height of each of the protrusions on said horn and each of the protrusions on said anvil is between 0.005 inches and 0.015 inches.

19. The ultrasonic sealing device of claim 18 wherein the height of each of the protrusions on said horn and each of the protrusions on said anvil is about 0.010 inches.

20. The ultrasonic sealing device of claim 12 wherein the first plane and the second plane are spaced apart by between 0.005 inches and 0.015 inches.

21. The ultrasonic sealing device of claim 20 wherein the first plane and the second plane are spaced apart by about 0.010 inches.

22. An ultrasonic sealing device, comprising:
a horn having a sealing surface;
an anvil having a sealing surface, at least one of said horn and said anvil being moveable to engage the sealing surface of said horn with the sealing surface of said anvil;
the sealing surfaces of each of said horn and said anvil including a plurality of protrusions and a recess between each pair of the protrusions, each of the protrusions having distal surface and sidewalls with curved edges therebetween and each of the recesses including a recess surface with curved edges, wherein a height of each of the protrusions on said horn and each of the protrusions on said anvil is between 0.005 inches and 0.015 inches;

wherein, upon engagement of the sealing surface of said horn with the sealing surface of said anvil, the distal surfaces of each of the protrusions on each of the sealing surfaces engage corresponding ones of the recess surfaces of each of the recesses on each of the sealing surfaces and define a plurality of melt initiation points with gaps between the sidewalls of each adjacent protrusion;

wherein the gaps between the sidewalls of each adjacent protrusion have a width between 0.001 inches to 0.003 inches, wherein a first subset of the plurality of melt initiation points lie in a first plane and a second subset of the plurality of melt initiation points lie in a second plane parallel to the first plane, such that the plurality of melt initiation points lie in the two parallel planes, and wherein the first plane and the second plane are spaced apart by between 0.005 inches and 0.015 inches; and wherein each of the protrusions on said horn has a radius of curvature between 0.045 inches and 0.055 inches, each of the protrusions on said anvil has a radius of curvature between 0.031 inches and 0.041 inches, each of the recesses in said horn has a radius of curvature between 0.045 inches and 0.055 inches and each of the recesses in said anvil has a radius of curvature between 0.042 inches and 0.052 inches.

23. The ultrasonic sealing device of claim 22 wherein each of the protrusions on said horn has a radius of curvature of about 0.050 inches, each of the protrusions on said anvil has a radius of curvature of about 0.036 inches, each of the recesses in said horn has a radius of curvature of about 0.050 inches and each of the recesses in said anvil has a radius of curvature of about 0.047 inches.

24. The ultrasonic sealing device of claim 22 wherein the gaps between the sidewalls of each adjacent protrusion have a width of about 0.002 inches.

25. The ultrasonic sealing device of claim 22 wherein the height of each of the protrusions on said horn and each of the protrusions on said anvil is about 0.010 inches.

26. The ultrasonic sealing device of claim 22 wherein the first plane and the second plane are spaced apart by about 0.010 inches.

* * * * *